(12) United States Patent
Ekholm

(10) Patent No.: US 6,919,020 B2
(45) Date of Patent: Jul. 19, 2005

(54) DISTRIBUTOR/COLLECTOR SYSTEM

(75) Inventor: Michael Ekholm, Minneapolis, MN (US)

(73) Assignee: Weatherford/Lamb, Inc., Houston, TX (US)

( * ) Notice: Subject to any disclaimer, the term of this patent is extended or adjusted under 35 U.S.C. 154(b) by 154 days.

(21) Appl. No.: 10/198,653

(22) Filed: Jul. 18, 2002

(65) Prior Publication Data

US 2003/0024885 A1 Feb. 6, 2003

Related U.S. Application Data

(60) Provisional application No. 60/306,619, filed on Jul. 19, 2001.

(51) Int. Cl.[7] .................................................. B01J 8/02
(52) U.S. Cl. ........................ 210/151; 210/279; 210/291; 210/191; 210/286; 210/284; 210/456; 422/188
(58) Field of Search ................................ 210/151, 279, 210/291, 191, 286, 284, 456; 422/188

(56) References Cited

U.S. PATENT DOCUMENTS

| | | | |
|---|---|---|---|
| 3,214,247 A | | 10/1965 | Broughton |
| 3,268,605 A | | 8/1966 | Boyd, Jr. |
| 3,523,762 A | | 8/1970 | Broughton |
| 4,099,559 A | * | 7/1978 | Butt ............................ 165/170 |
| 4,379,050 A | | 4/1983 | Hess et al. |
| 4,407,269 A | * | 10/1983 | Hopper ........................ 126/634 |
| 4,809,744 A | * | 3/1989 | Bhat ........................ 137/561 A |
| 4,871,463 A | | 10/1989 | Taylor et al. |
| 4,999,102 A | | 3/1991 | Cox et al. |
| 5,124,133 A | | 6/1992 | Schoenrock |
| 5,413,091 A | * | 5/1995 | Bourke ........................ 126/598 |
| 5,755,960 A | | 5/1998 | Callebert et al. |
| 5,846,411 A | | 12/1998 | Harter et al. |
| 5,972,214 A | | 10/1999 | Callebert et al. |
| 6,015,491 A | | 1/2000 | Renard et al. |
| 6,024,871 A | | 2/2000 | Harter et al. |
| 6,156,197 A | | 12/2000 | Dessapt et al. |
| 6,402,959 B1 | | 6/2002 | Dessapt et al. |

FOREIGN PATENT DOCUMENTS

| | | |
|---|---|---|
| CH | 231904 | 7/1944 |
| EP | 0 074 815 A2 | 3/1983 |
| EP | 0 769 316 A1 | 4/1997 |
| WO | WO 95/03867 | 2/1995 |

OTHER PUBLICATIONS

PCT International Search Report, International Application No. PCT/GB 02/03301, dated Oct. 4, 2002.

\* cited by examiner

*Primary Examiner*—Minh-Chau T. Pham
(74) *Attorney, Agent, or Firm*—Moser, Patterson & Sheridan, L.L.P.

(57) ABSTRACT

A distributor/collector system includes a distributor provided with an upper header having upper laterals carrying fluid away from the upper header and a collector provided with a lower header having lower laterals carrying fluid toward the lower header. Flow enters the distributor on one side of the vessel and exits the collector on an approximately opposite side of the vessel. The distance traveled by each fluid particle through the system is substantially the same.

22 Claims, 2 Drawing Sheets

DISTRIBUTOR/COLLECTOR SYSTEM

CROSS-REFERENCE TO RELATED APPLICATIONS

This application claims benefit of U.S. provisional patent application Ser. No. 60/306,619, filed Jul. 19, 2001, which is herein incorporated by reference.

BACKGROUND OF THE INVENTION

1. Field of the Invention

The present invention relates to fluid filtration, and particularly to a filtration system including a vessel containing a media through which a fluid is filtered. More particularly, the present invention relates to a distributor/collector system positioned within the vessel for directing the flow of fluid through the media bed.

2. Description of the Related Art

Conventional distributor/collector systems are positioned in a vessel with the collector spaced-apart from the distributor and positioned downstream of the distributor. A typical distributor/collector system includes an upper header as part of the distributor and a lower header as part of the collector, each running generally transversely through the vessel and generally parallel to each other. Both the upper header and lower header include a series of laterals extending radially away from the header and generally in a plane perpendicular to a longitudinal axis of the vessel. In a typical distributor/collector system, a fluid (e.g. water, etc.) enters the vessel and flows down the upper header generally along a diameter of the vessel and then away from the upper header through the upper laterals. From there, the water flows through a media bed below the upper header and into the lower laterals below the media bed. The water then is collected by the lower laterals and carried back toward the center of the vessel to the lower header, which sits generally along a diameter of the vessel, like the upper header. Finally, the water flows down the lower header and exits the vessel on generally the same side of the vessel as it entered the vessel.

In conventional distributor/collector systems, the flow may not be uniform throughout the media bed. The time it takes water to flow through the system at certain points within the media bed may vary from the time it takes water to flow through the system at other points within the media bed. Water which flows out the upper laterals close to the upper header also flows into the lower laterals close to the lower header and, therefore, travels a shorter distance through the system than water which travels out the upper laterals at a distance away from the upper header and into the lower laterals at a point distant from the lower header. These various flow paths through a typical system create various levels of flow through the system. A distributor/collector apparatus that provides even flow throughout the system and, thus, a high distribution efficiency (the ratio between the lowest flow and highest flow that exits the distributor or enters the collector) would be welcomed by users of filtration systems utilizing such a distributor/collector.

SUMMARY OF THE INVENTION

According to the present invention, a distributor/collector system includes a distributor comprising an upper header having upper laterals carrying fluid away from the upper header and a collector comprising a lower header having lower laterals carrying fluid toward the lower header. Flow enters the distributor on one side of the vessel and exits the collector on an approximately opposite side of the vessel.

In preferred embodiments, the upper header extends through the vessel approximately along a diameter of the vessel and tapers away from an end of the upper header into which the flow enters. Extending outwardly from the upper header are the upper laterals, each preferably comprising a perforated base pipe surrounded by a filtering material, such as wire-mesh or V-shaped profile wire screen, etc. In preferred embodiments, the lower header is "horseshoe-shaped" or "wishbone-shaped" and includes two branches, each extending generally along the perimeter of the vessel. The lower laterals, each comprising a perforated basepipe surrounded by a filtering screen, as described with respect to the upper laterals, extend toward one of the branches of the lower header. Additionally, each branch of the lower header tapers toward an end of the branch.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

Additional features and advantages of the invention will become apparent to those skilled in the art upon consideration of the following detailed description of preferred embodiments exemplifying the best mode of carrying out the invention as presently perceived.

So that the manner in which the above recited features of the present invention, and other features contemplated and claimed herein, are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 2 is a top view of the distributor of FIG. 1, illustrating the flow of fluid there through.

FIG. 3 is a side view, with portions cut away, of the distributor/collector system of FIG. 1 illustrating a media bed between the distributor and collector and illustrating the flow of fluid there through; and FIG. 4 is a top view of the collector of FIG. 1, illustrating the flow of fluid there through.

DETAILED DESCRIPTION OF THE PREFERRED EMBODIMENT

Figure 1:
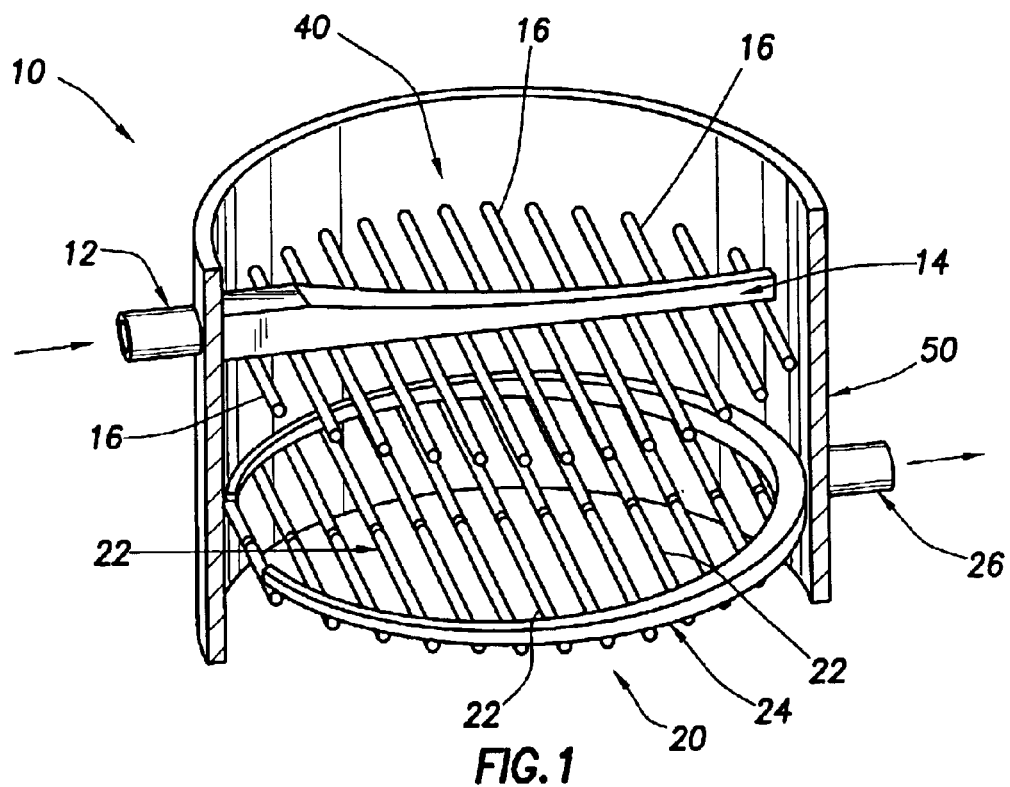
FIG. 1 is a perspective view, with portions cut away, of a distributor/collector system in accordance with the present invention showing an upper header having a plurality of upper laterals extending outwardly from the upper header and a lower header having two branches, each branch extending generally along the perimeter of the vessel and including a plurality of lower laterals extending inwardly from each branch.
Figure 2:
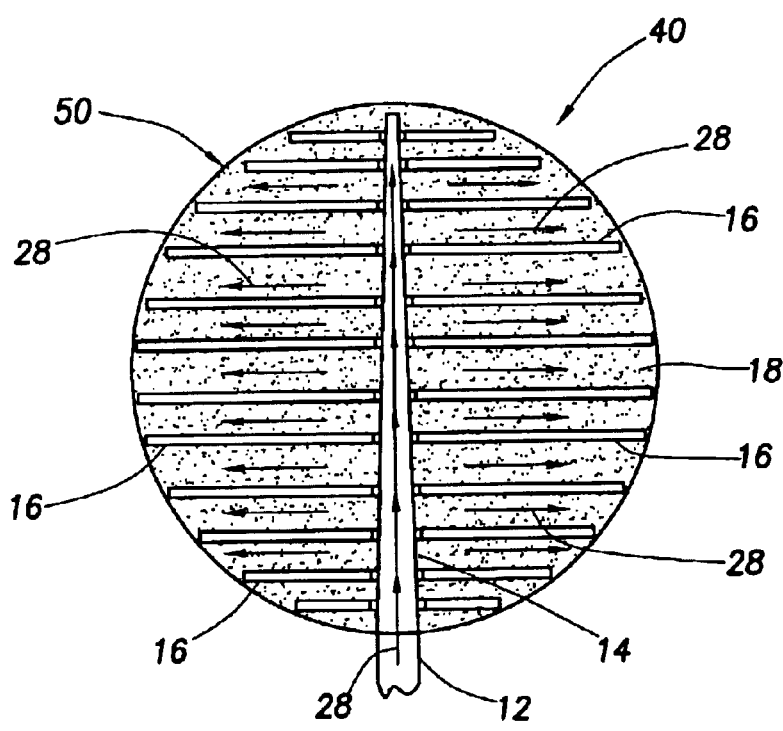
Figure 3:
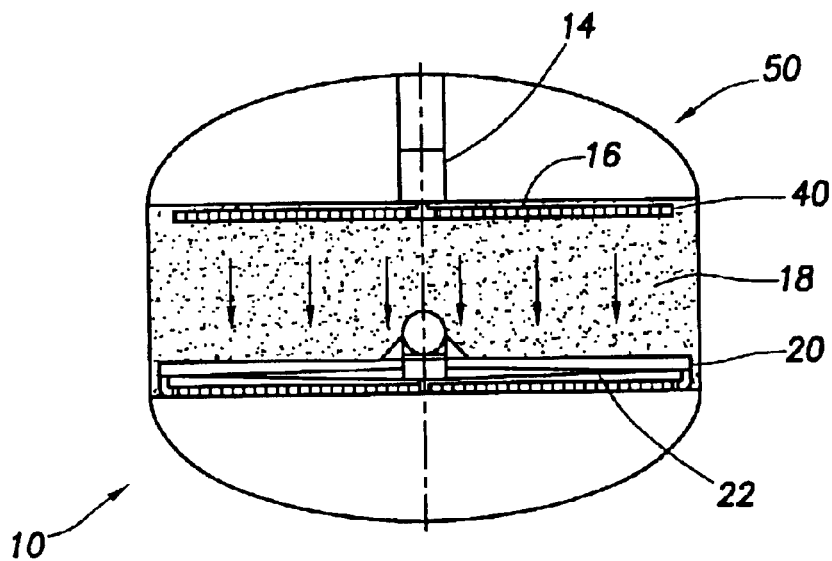

A distributor/collector system 10 in accordance with the present invention is shown positioned within a vessel 50 in FIGS. 1 through 4. Referring to FIG. 1, a fluid (not shown, e.g., water, etc.) enters a distributor 40 through an inlet tube 12 and flows down an upper header 14 of the distributor 40. From the upper header 14, the fluid flows outwardly away from the upper header 14 through a series of upper laterals 16. The upper laterals 16 distribute the fluid along their lengths and out the upper laterals 16 into a media bed 18 positioned below the distributor 40, as best seen in FIG. 3. The flow travels through the media bed 18 and is collected by a collector 20 positioned below the media bed 18. After flowing through the media bed 18, the flow enters a series of lower laterals 22 of the collector 20. From there, the flow travels along the lower laterals 22, outwardly toward the outside of the vessel 50, and into a lower header 24. The lower header 24 includes two branches 25, which carry the flow generally along the perimeter of the vessel 50 to an outlet pipe 26, where the flow exits the vessel 50.

Referring to FIG. 2, the direction of flow through the distributor is indicated by a series of arrows 28. As can be seen, the flow enters the vessel 50 at the inlet tube 12 and travels down the upper header 14, which tapers away from the inlet tube 12. The upper header 14 is in fluid communication with the upper laterals 16. Therefore, the flow traveling through the upper header 14 is distributed to the upper laterals 16, which carry the flow away from the upper header 14. Each upper lateral 16 comprises a perforated pipe (not shown), which permits the flow to exit the upper lateral 16 and enter the media bed 18 positioned below the distributor 40. The perforated pipe of the upper lateral 16 may also be surrounded by a filtering material, such as wire mesh or V-shaped profile wire screen. In this way, the fluid is dispersed by each upper lateral 16 over the length of each upper lateral 16. Further, the perforations in the upper laterals 16 may be varied in size along the length of each upper lateral 16 so that the flow exiting the upper laterals 16 at different points along the length of each upper lateral 16 is uniform. In other words, the perforations in the upper laterals 16 toward the upper header 14 may be larger or smaller than the perforations of the upper laterals 16 away from the upper header 14 to achieve even flow distribution there through.

Figure 4:
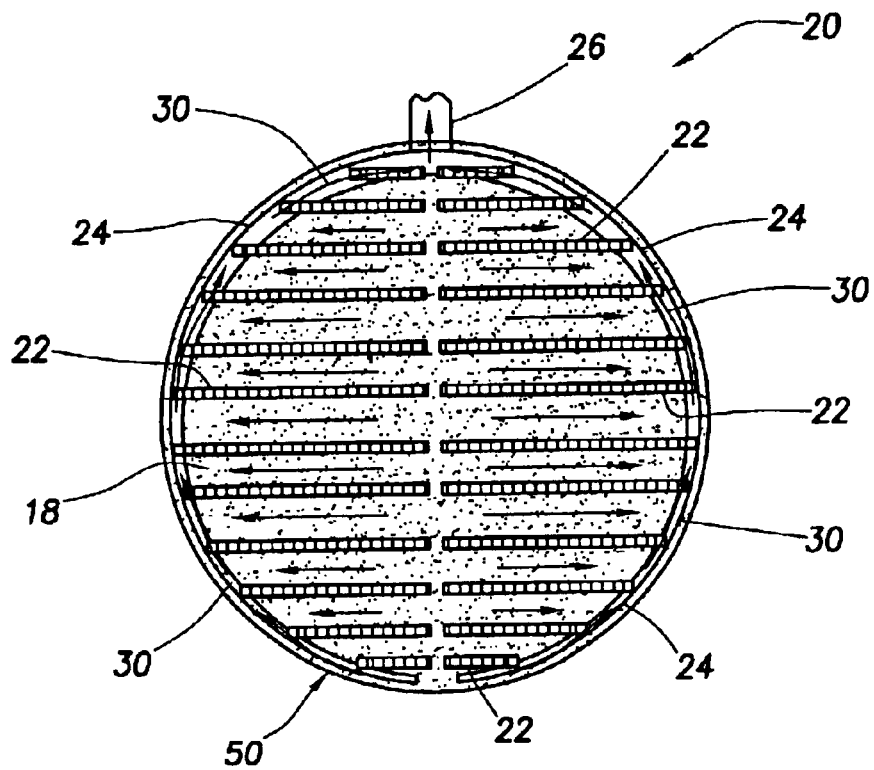

After the flow has exited the upper laterals 16, it travels through the media bed 18, as shown in FIG. 3. As best seen with reference to FIGS. 3 and 1, after the flow has traveled through the media bed 18, it contacts the lower laterals 22 of the collector 20. The lower laterals 22 are constructed in much the same way as described above with respect to the upper laterals 16. Preferably the lower laterals include a perforated pipe surrounded by a filtering material, such as wire-mesh or profile wire screen, but it will be understood by one of ordinary skill in the art that other configurations of the upper or lower laterals, which allow for flow there through, may be used. Once the flow enters the lower laterals 22, it is directed outwardly toward the "wishbone-shaped" or "horseshoe-shaped" lower header 24 extending generally around the perimeter of the vessel 50, as best seen with respect to FIGS. 4 and 1. Referring to FIG. 4, the direction of flow through the collector 20 is shown generally by arrows 30. As can be seen with reference to FIG. 4, after the flow is directed down lower laterals 22 and into the lower header 24, it is carried to the outlet pipe 26 by one of two branches 25 of the "wishbone shaped" lower header 24. From there, the flow exits the vessel 50 through the outlet pipe 26. As with the upper header 14, the lower header 24 is tapered to facilitate even flow distribution and resulting pressure drops throughout the distributor/collector system 10.

Referring to FIG. 1, flow which exits the distributor 40 at a point along the length of an upper lateral 16 will enter a lower lateral 22 at a point approximately directly below the point at which the flow exited the upper lateral 16. In other words, for each exit point from an upper lateral 16, there is a corresponding, paired entry point in a lower lateral 22 directly below. In this way, regardless of the path over which a particular fluid particle flows through the distributor/collector system 10 of the present invention, the distance the flow particle will travel from the inlet tube 12 to the outlet tube 26 will be approximately constant. In other words, if a fluid particle follows a flow path down the upper header 14 and out an upper lateral 16 very close to the upper header 14, it will enter a corresponding lower lateral 22 at a point relatively distant from a branch 25 of the lower header 24. In this way, while the fluid particle has flowed a relatively short distance along the length of an upper lateral 16, it will be flow a relatively long distance through a lower lateral 22 to reach the lower header 24 and flow out of the vessel. Similarly, a fluid particle which exits an upper lateral 16 at a point relatively distant from the upper header 14 will enter a lower lateral 22 at a distance relative close to the lower header 24. In either case, the distance over which the fluid particle has traveled through the distributor/collector system 10 will be approximately the same and the time spent in the vessel 50 by the particle will be the same. This also holds true for fluid which exits the distributor 40 relatively close to the inlet tube 12 versus fluid which exits the distributor 40 relatively distant from the inlet tube 12, and vise versa. Flow which exits the distributor 40 relatively close to the inlet tube 12 will enter the collector 20 relatively distant from the outlet tube 26 and, therefore, will be required to travel over a relatively long length of the lower header 24 to reach the outlet tube 26. Fluid which exits the upper header 14 relatively distant from the inlet tube 12 will enter the lower header 24 relatively close to the outlet tube 26 and will be required to travel a relatively short distance through the lower header 24 before it exits the vessel 50.

The inlet tube 12 is preferably oriented approximately 180 degrees around the vessel 50 from the outlet tube 26, the upper header 14 and lower header 24 are both tapered, and the distributor 40 and collector 20 are generally configured as shown to create uniform flow distribution through the media bed 18, uniform pressure drop through the system 10, and produce a relatively high distribution efficiency for the distributor/collector system 10 according to the present invention. Accordingly varying the size of the perforations (not shown) over the length of the upper and lower laterals 16, 22 further contributes to uniform flow distribution and high distribution efficiency. In addition, the system 10, creates a balanced residence time (the time it takes fluid to flow through the entire system 10) by creating flow paths of a constant length. Residence time is also minimized, as is the required height of the entire vessel 50 and media bed 18, as shown in FIG. 3. Lastly, the distributor/collector system 10 according to the present invention creates plug flow through the media bed 18, as will be readily apparent to one of ordinary skill in the art give the above detailed description of the distributor/collector system 10.

The orientation of the system is to approximate the behavior of a fractal system in that the path taken through the distributor 40, through the media bed 18 and back through the collector 20 has the same residence time regardless of the direction of the path. The general concept is to use a continuous reduction straight header 14 as a distributor 40 on the top and a horseshoe-shaped header 24 for even collection and back washing at the bottom. (This arrangement can be reversed, however).

Although the invention has been described in detail with reference to certain preferred embodiments, variations and modifications exist within the scope and spirit of the invention as described and defined above.

While the foregoing is directed to embodiments of the present invention, other and further embodiments of the invention may be devised without departing from the basic scope thereof, and the scope thereof is determined by the claims that follow.

I claim:

1. A fluid treatment system, comprising:
   a chamber having an inlet and an outlet;
   a first header in fluid communication with the inlet, wherein the first header is tapered to facilitate even pressure drops therethrough;
   a second header in fluid communication with the outlet, the second header comprising two interconnected branches extending substantially around the perimeter of the chamber, wherein each branch tapers to a point on the header to facilitate even flow distribution and even pressure drops therethrough; and
   a media bed, wherein a fluid entering the first header is directed through the media bed and collected by the second header, and wherein an action of the media bed on the fluid is substantially uniform.

2. The fluid treatment system of claim 1, wherein a residence time of each fluid particle is substantially the same.

3. The fluid treatment system of claim 1, wherein a distance traveled by each fluid particle in the system is substantially the same.

4. The fluid treatment system of claim 1, wherein fluid flow through the media bed comprises plug flow.

5. The fluid treatment system of claim 1, wherein the first header and second header comprises one or more laterals.

6. The fluid treatment system of claim 5, wherein a fluid exiting from a point of the one or more laterals of the first header will enter the one or more laterals of the second header at a point approximately adjacent the point at which the fluid exited the first header.

7. The fluid treatment system of claim 5, wherein the one or more laterals include one or more perforations.

8. The fluid treatment system of claim 7, wherein each of the one or more perforations along a length of each of the one or more laterals are varied in size so that fluid exiting the one or more laterals is uniform.

9. The fluid treatment system of claim 1, wherein the first header includes one or more laterals extending away from the first header.

10. The fluid treatment system of claim 1, wherein the first header is horseshoe-shaped.

11. The fluid treatment system of claim 1, wherein the two branches form a horseshoe-shape.

12. The fluid treatment system of claim 1, wherein each of the two branches includes one or more laterals.

13. The fluid treatment system of claim 12, wherein the one or more laterals are at least partially surrounded by filtering material.

14. The fluid treatment system of claim 1, wherein the inlet and the outlet are oriented about 180 degrees around the treatment system.

15. A method of treating fluid, comprising:
    flowing a fluid through an inlet of a chamber;
    distributing the fluid through a first header, wherein the first header is tapered to facilitate even pressure drops therethrough;
    flowing the fluid through a media bed;
    collecting the fluid through a second header comprising two interconnected branches extending substantially around the perimeter of the chamber, wherein each branch tapers to a point on the second header to facilitate even flow distribution and even pressure drops therethrough; and
    delivering the fluid through an outlet of the chamber, wherein a treatment of the fluid flowing through the media bed is substantially uniform.

16. The method of treating fluid of claim 15, wherein the first header comprises one or more perforated laterals.

17. The method of treating fluid of claim 16, wherein the two branches are two tapered tubulars, each having one or more perforated laterals.

18. The method of treating fluid of claim 17, wherein the two tapered tubulars are arcuate in shape.

19. The method of treating fluid of claim 18, wherein the two tapered tubulars form a horseshoe-shape.

20. The method of treating fluid of claim 19, wherein the fluid exiting from a point of the one or more laterals of the first header will enter the one or more laterals of the second header at a point approximately directly below the point at which the fluid exited the first header.

21. The method of treating fluid of claim 15, wherein the first header comprises two tubulars, each having one or more perforated laterals.

22. The method of treating fluid of claim 21, wherein the two tubulars form a horseshoe-shape, which extend around the perimeter of the chamber.

* * * * *